United States Patent Office 2,938,853
Patented May 31, 1960

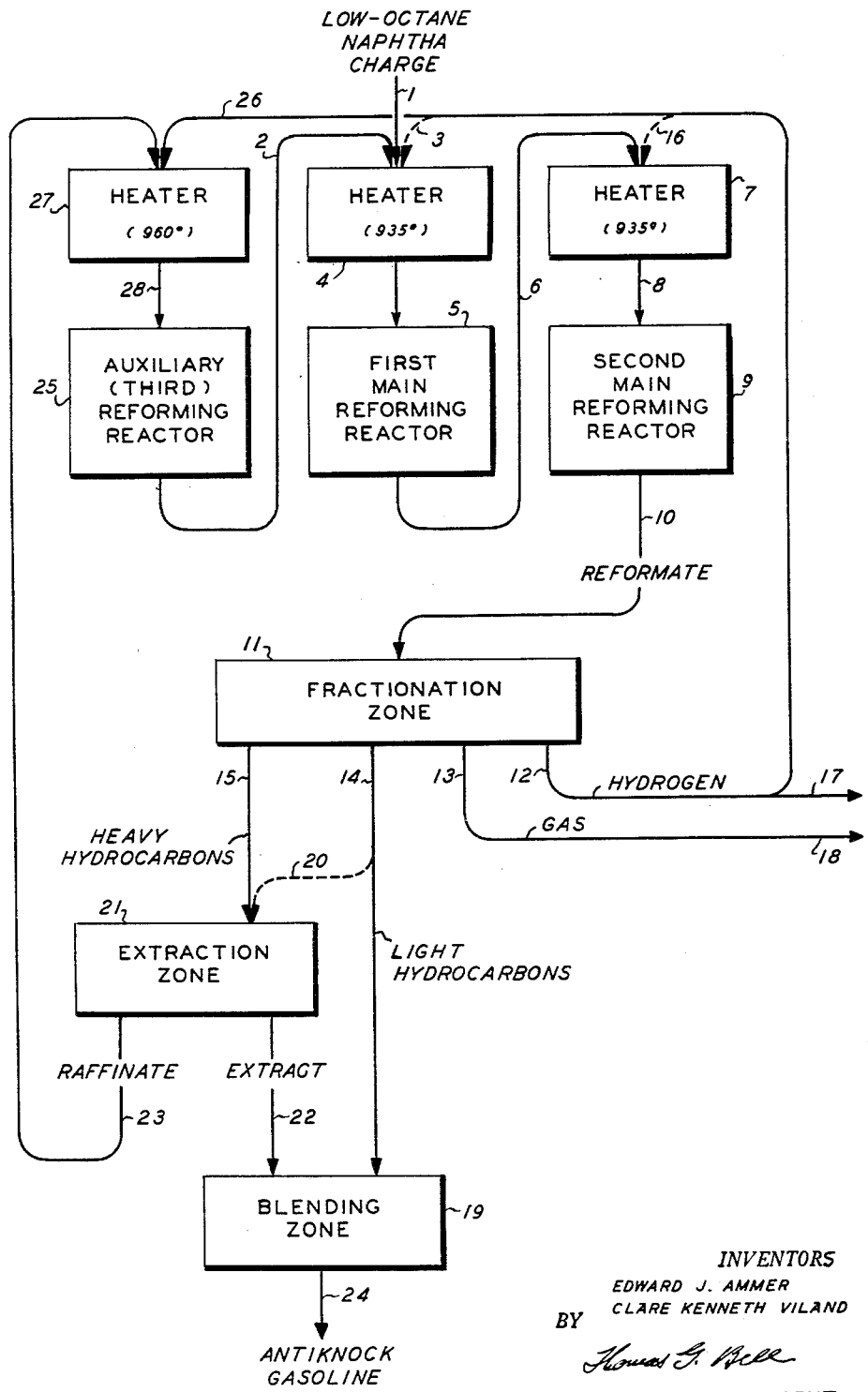

2,938,853

MANUFACTURE OF ANTIKNOCK GASOLINE

Edward J. Ammer, Concord, and Clare Kenneth Viland, Martinez, Calif., assignors to Tidewater Oil Company, a corporation of Delaware Filed Mar. 27, 1956, Ser. No. 574,295

4 Claims. (Cl. 208—65)

This invention relates to the catalytic reforming of naphtha fractions to produce gasoline constituents of high antiknock quality. More particularly, it relates to a combination of catalytic reforming, separation, and raffinate reforming processes whereby a greater yield of high quality product is obtained than can be achieved by conventional catalytic reforming alone.

Progress in the automative industry has resulted in the development of gasoline engines of higher and higher compression pressures, requiring gasoline fuels with correspondingly higher antiknock properties or "octane rating." To meet this demand, the petroleum industry has developed various processes for producing gasoline of increased octane rating. One of the more efficient of such processes is catalytic reforming, wherein low-octane naphtha is contacted in the vapor-phase with suitable catalyst at temperatures above 800° F., in the presence of substantial volumes of hydrogen. A common type of catalyst used for catalytic reforming is platinum supported on a carrier of alumina and/or silica. Several such platinum catalysts on the market will produce good yields of 85 to 90 "research" octane number (ASTM Method D908-53) reformate under operating conditions sufficiently mild that the catalyst can be used for extended periods of time without "regeneration" to remove the carbon formed by undesirable cracking reactions.

More recent developments in the automotive industry have created a need for gasoline having a research octane number substantially above 90 (before the addition of tetraethyllead or other antiknock compound) and preferably above 96. To meet this requirement by catalytic reforming processes now in use, it is necessary to increase the severity of operating conditions to an extent that a substantial amount of hydro-cracking occurs with concomitant decrease in naphtha yield, increased equipment and operating cost to regenerate the catalyst (by burning off the carbon formed), and increased cost for suitable catalyst material capable of tolerating frequent regeneration without a prohibitive amount of deterioration.

In accordance with the present invention, by the use of certain separation processes in combination with catalytic reforming under mild conditions, a higher yield of usable components for a 96 to 98 (or higher) octane gasoline can be obtained, than can be produced by catalytic reforming alone under conditions severe enough to produce the same antiknock quality.

Broadly, an invention disclosed and claimed in an application by Clare Kenneth Viland, Serial Number 477,251 filed December 23, 1954, now U. S. Patent 2,880,164, comprises catalytically reforming a naphtha of low antiknock quality, separating from the reformate a concentrate containing most of the aromatics therein, and returning the remaining predominately paraffinic portion of the reformate to the reforming step for further conversion. The present invention relates to further improvements, wherein this predominately paraffinic reformate portion (or raffinate) is first charged to a separate reforming reactor before being introduced into the fresh naphtha charge. Important results follow from this novel procedure, and these results cannot be obtained by charging the raffinate and fresh feed together into the same reactor.

It has been discovered that, when a normal fresh feed is reformed, naphthenes are converted to aromatics early in the reactor and that in the later stages of the reforming step there is more hydro-cracking and less dehydrocyclization. While the hydro-cracking is valuable and is a potent means for upgrading some higher molecular weight paraffins, it is generally of less value than dehydrocyclization. Furthermore, it has been discovered that hitherto the dehydrocyclization reaction had been hindered by the presence of aromatics in the reaction zone. In other words, the aromatics present in the original naphtha charge plus the aromatics formed from naphthenes in the early stages of the reformer tend to suppress the formation of further aromatics from paraffins by dehydrocyclization.

Experiments have shown that in catalytic reforming, there is selective adsorption of aromatics on the active sites of the catalyst and that the lower the concentration of the aromatics in the feed, the greater the percentage of resulant paraffin aromatization. For example, in experiments where a gasoline of purely paraffinic character was reformed under normal conditions (e.g., 500 p.s.i. at 925° F., with 8 to 10 moles of hydrogen per mole of hydrocarbon feed) 25% of aromatics was formed. Under the same conditions a naphtha containing 44% naphthenes and 15% aromatics gave a conversion of paraffin to aromatics of only about 5%. Moreover, the aromatics and naphthenes in the fresh feed not only suppress the dehydrocyclization reaction of the paraffins in the fresh feed but also suppress the dehydrocyclization of the paraffins in the raffinate.

The present invention takes advantages of the fact that the percentage of aromatics present in the raffinate is very low, approaching zero. Therefore, by charging this raffinate, before mixing it with the fresh feed, to a separate reforming reactor, an accelerated dehydrocyclization takes place, giving a higher percentage yield of aromatics from the paraffins. This reformed raffinate is then mixed with the fresh feed for subsequent additional reformation. While the increased aromatics content of the partially reformed raffinate tends to increase somewhat the suppression of dehydrocyclization during reformation of the raffinate-fresh-feed mixture, this suppression merely means that such dehydrocyclization is deferred. When the unreformed paraffins reach the special raffinate reformer, the reaction is greatly augmented, and there is a considerable net increase in desirable aromatics.

An important object of the present invention is to increase dehydrocyclization efficiency. An unexpected result of separate reformation of the raffinate is that substantially higher temperatures can be used in the raffinate reforming zone than are practical in the initial reformer. The reason for this is that apparently the absence of naphthenes and aromatics in the raffinate greatly reduces the fouling of the catalyst by reaction products in the raffinate reformer. As a result of the practicability of increased temperature, the efficiency of dehydrocyclization is further increased.

Another object of the invention is to obtain a higher volume yield of extract per fresh feed charge. This object is achieved by the increased efficiency in converting paraffins to aromatics in the raffinate reformer.

Another object of the invention is to increase the quantity of hydrogen produced per barrel of fresh feed. This is valuable because there is usually considerable use for hydrogen in refineries.

Still another important object of the invention is to lower the yield of butane, pentane, and hydrocarbon gases. It has long been known that the production of these lighter fractions is uneconomic relative to the production of antiknock gasoline of high aromatics content. The invention achieves this object and results in a more economic yield from the reforming zone.

Concentration of the aromatics in the extraction zone may be by any suitable process capable of giving a raffinate of low aromatic content, such as for example, by use of silica gel; by extractive distillation in the presence of phenol, cresylic acids, sulfolanes, or glycol-water mixtures; or by solvent extraction (e.g. with liquid sulphur dioxide or diethylene glycol). The low antiknock naphtha fed to the process may be a virgin naphtha or it may be a fraction produced from other refining processes such as hydrodesulphurization. In a specific form of the invention, low-boiling, predominately isoparaffinic hydrocarbons may be removed by fractionation from the reformate prior to the separation step and combined with the aromatic concentrate to produce a mixture of increased value in gasoline blending.

The invention may be more readily understood by reference to the drawing, which is a flow diagram of the process. Naphtha in line 1 is mixed with partially reformed raffinate from line 2 and recycle hydrogen from line 3 and heated by a suitable heating means 4 to a temperature in excess of 800° F., preferably enough to give a temperature of 935° F. when the heated mixture is charged to the inlet of a first main catalytic reforming reactor 5. There, the mixture of hydrocarbons and hydrogen is passed in the vapor phase through a bed of reforming catalyst at conditions of pressure, time and hydrogen concentration to aromatize the naphthenes, to convert some of the paraffinic charge to aromatic hydrocarbons, to isomerize other paraffinic constituents, and to produce hydrogen and certain low-boiling hydrocarbons. As is well known to the art, increased time and temperature and reduced pressures in catalytic reforming tend to increase reactions which result in the formation of larger quantities of normally gaseous hydrocarbons and carbon. In accordance with the present invention, the conditions in zone 5 are maintained sufficiently moderate to permit treatment of at least 30 barrels of naphtha per pound of catalyst (and preferably more) without regeneration or replacement of catalyst. While such conditions vary with the naphtha treated and with the particular catalyst used, those conversant with catalytic reforming can readily select suitable conditions.

The effluent from the catalytic reforming zone 5, comprising hydrogen, normally gaseous hydrocarbons, and normally liquid aromatic and paraffinic hydrocarbons, is preferably discharged through line 6 into heater 7 and from there through line 8 into a second main reforming reactor 9, where similar reactions take place. There may be additional reforming reactors, or the second one may be omitted. The effluent from the last main reactor is discharged through line 10 into a fractionating zone 11, which includes suitable traps, stills, absorption equipment and the like to fractionate the effluent into such fractions as (1) a hydrogen fraction containing upwards of about 70% hydrogen, shown as leaving the fractionation zone 11 through line 12; (2) a gas fraction composed principally of the $C_1$ to $C_3$ hydrocarbons formed in the reactors 5 and 9, but which may also contain some hydrogen and $C_4$ and $C_5$ hydrocarbons, shown as leaving through line 13; (3) a light hydrocarbon fraction (line 14) composed mainly of hydrocarbons boiling below about 200° F.; and (4) a heavy hydrocarbon fraction composed mainly of hydrocarbons boiling above about 200° F., which leaves through line 15.

Part of the hydrogen fraction in line 12 is recycled to the first main reforming reactor 5 through line 3 to maintain the required ratio of hydrogen therein in accordance with known principles. If desired, some may also be supplied to the second subsequent main reactor 9, as through line 16. If desired, such hydrogen fraction may be treated to remove hydrogen sulphide or other unwanted impurities prior to entry into the reaction zones. Most of the hydrogen fraction in line 12 is passed through line 17 for any desired disposal. Likewise, the gas fraction in line 13 is disposed of as desired through line 18.

Due to the nature of catalytic reforming, the light hydrocarbons in line 14 contain high percentages of isoparaffins. Although these have only fair antiknock value as compared with the aromatics, they do provide needed low boiling-point constituents having relatively high antiknock value as compared to other materials of the same average volatility. In a preferred form of the invention, these are passed directly to blending zone 19 to be included in the finished gasoline. However, if desired, any or all of the hydrocarbons in line 14 may be mixed with the heavy hydrocarbons in line 15 to be treated therewith, as illustrated in the drawing by dotted line 20.

The heavy hydrocarbons in line 15, together with any desired hydrocarbons from lines 14 and 20, are charged to extraction zone 21. In extraction zone 21, the hydrocarbons are separated into an extract (composed predominately of aromatic hydrocarbons, shown as leaving through line 22) and raffinate (composed essentially of paraffinic hydrocarbons, shown as leaving through line 23). As indicated before, various well-known methods for separating aromatic from paraffinic hydrocarbons may be used for the separation in the extraction zone 21. Extraction with liquid sulphur dioxide has proven suitable, and will be used elsewhere herein for illustration.

The extract in line 22 is passed to the blending zone 19 where it is blended with light hydrocarbons from line 14 to form antiknock gasoline, shown as leaving the blending zone 19 through line 24. If desired, ingredients from other sources may be added in zone 19 for augmenting the quantity, correcting the volatility, or further improving the octane number.

The raffinate in line 23 is returned for further reforming. However, instead of mixing the raffinate with the low-octane fresh naphtha charge in line 1 and introducing the mixture into the first reforming reactor 5, the present invention interposes a third, auxiliary, reforming reactor 25, which may be of the same general type as reactors 5 and 9, although it may be smaller. Accordingly, the raffinate is passed through line 23 in admixture with hydrogen from line 26 into a heater 27 and thence through line 28 to the reactor 25. Preferably, the inlet temperature at reactor 25 is somewhat higher than that at reactors 5 and 9. The temperature of reaction may be higher because, since there are substantially no aromatics present at the commencement of the reaction, there is less fouling of the catalyst. Thus, for example, instead of an inlet temperature of about 935° F., which is convenient and practical for the first and second main reactors 5 and 9, the auxiliary reactor 25 may have an inlet temperature of about 960° F., thereby obtaining a greater yield of aromatics. The resultant product from reactor 25 is then passed through line 2 and mixed with fresh feed in line 1 and charged into the first reforming reactor.

This invention will be further understood from the following specific example.

*Example*

A fresh feed naphtha may consist of a straight run naphtha with an A.P.I. gravity of 49.6, and a research octane number of 53.3 clear, and 70.8 with 3 cc. of tetraethyllead per gallon with the following ASTM distillation:

| | |
|---|---|
| Initial boiling point, °F | 258 |
| 5% | 277 |
| 10% | 283 |
| 30% | 300 |
| 50% | 319 |
| 70% | 341 |
| 90% | 369 |
| 95% | 380 |
| End point | 409 |

Analysis of the fresh charge:

| | |
|---|---|
| Paraffin, vol. percent | 41.4 |
| Olefins, vol. percent | 0.6 |
| Naphthenes, vol. percent | 40.0 |
| Aromatics, vol. percent | 18.0 |

The operating conditions in the auxiliary reforming reactor, to which the raffinate is charged, may be as follows:

| | |
|---|---|
| Auxiliary reactor inlet temperature, °F | 960 |
| Auxiliary reactor pressure, p.s.i.g | 500 |
| Space velocity (ratio liquid volume charge per hour to gross volume catalyst) | 5 |
| Hydrogen ratio, mol. $H_2$/mol. H.C | 5.5 |
| Catalyst life, days | 150 |

The following tabulation shows a comparison of the conditions and the results with the above charge applied to (1) the improved catalytic reforming method described in U.S. Patent No. 2,880,164, where the raffinate is mixed with the fresh feed and the mixture reformed in three successive reactors, and (2) the still more improved method of this application wherein the raffinate is first separately reformed in a single auxiliary catalytic reactor and, after mixing with the fresh feed, is charged to two successive main reactors:

| | Raffinate not separately reformed by auxiliary reactor | Raffinate first separately reformed by auxiliary reactor, as above |
|---|---|---|
| Conditions in Main Reformer: | | |
| Main Reactor Inlet Temperature, °F | 935 | 935 |
| Main Reactor Pressure, p.s.i.g | 500 | 500 |
| Space Velocity | 3 | 3 |
| Hydrogen Ratio | 5.5 | 5.5 |
| Catalyst Life, Days | 150 | 150 |
| Main Reformer Charge: | | |
| Free Naphtha, bbls./day | 10,000 | 10,000 |
| Recycle Raffinate, bbls./day | 5,000 | 3,150 |
| Total, bbls./day | 15,000 | 13,150 |
| Reformer Yields: | | |
| Hydrogen Fraction (net) Mc.f./day | 6,470 | 7,320 |
| Dry Gas Fraction, Mc.f./day | 2,130 | 1,590 |
| Butanes, bbls./day | 1,190 | 900 |
| Pentanes, bbls./day | 1,110 | 800 |
| Depentanized Reformate, bbls./day | 11,900 | 10,550 |
| Extraction Conditions: | | |
| Volume $SO_2$ per volume Reformate | 1.25 | 1.25 |
| Temperature, °F | −25 | −25 |
| Extraction Yields: | | |
| Extract, bbls./day | 6,900 | 7,400 |
| Raffinate, bbls./day | 5,000 | 3,150 |
| Overall Processing Yields: | | |
| Hydrogen Fraction (net) Mc.f./day | 6,470 | 7,320 |
| Dry Gas Fraction, M c.f./day | 2,130 | 1,590 |
| Methane | 360 | 260 |
| Ethane | 520 | 380 |
| Propane | 1,250 | 950 |
| Butanes, bbls./day | 1,190 | 900 |
| Pentanes, bbls./day | 1,110 | 800 |
| Extract,[1] bbls./day | 6,900 | 7,400 |
| Liquids, volume percent of charge: | | |
| Butanes | 11.9 | 9.0 |
| Pentanes | 11.1 | 8.0 |
| Depentanized extracts | 69.0 | 74.0 |

[1] (98+Octane No. ASTM D-908-53.)

The example shows a marked increase, 5% by volume, in the depentanized extract when using the present invention. It also shows a marked decrease (3.1%) in the volume of pentanes and 2.9% in the volume of butanes. It will also be noted that the hydrogen increases about 15% by volume while the methane is reduced about 28%, the ethane about 27%, and the propane about 26%. There is approximately the same overall liquid volume percentage recovery.

In addition to advantages in product quality and yield, the invention has operating advantages as well. For one thing, with the same fresh naphtha charge of 10,000 bbls./day to the reformer (and an increased ultimate yield of antiknock gasoline components) the total charge (fresh feed plus raffinate) that has to be reformed is approximately 1,850 bbls./day less. This reduction in the amount that has to be processed results in savings of heat, compressor volume, and catalyst. For another thing, the extra reforming zone is operated without any increase in catalyst volume. A third advantage is that substantially less reformate is charged to the extraction zone, the reduction amounting to approximately 1,350 bbls./day. This means considerable savings in the sulphur dioxide or other extracting agent used, as well as savings in handling compression and refrigeration of the extraction solvent. Thus the invention obtains improved overall performance at reduced costs.

We claim:

1. A process for producing highly aromatic antiknock gasoline components, which comprises catalytically reforming in the presence of hydrogen and of a platinum-containing catalyst, under non-regenerative conditions, at a temperature of about 935° F. and at a pressure of about 500 p.s.i., a naphtha fraction within the gasoline boiling range to convert a substantial portion of said naphtha to aromatic hydrocarbons with the production of additional hydrogen, separating at least the higher boiling constituents of the resulting reformate into a predominately aromatic portion and a predominately paraffinic portion, partially catalytically reforming in the presence of hydrogen and of platinum-containing catalyst, under non-regenerative conditions, said predominantly paraffinic portion at a temperature of about 960° F. and at a pressure of about 500 p.s.i., and then introducing the resultant partially reformed paraffinic portion into the first-mentioned catalytic reforming step as part of said naphtha fraction.

2. In a process for producing highly aromatic antiknock gasoline components by catalytically reforming with platinum-containing catalyst, under non-regenerative conditions, in the presence of hydrogen at about 935° F. and at about 500 p.s.i. a naphtha fraction within the gasoline boiling range and solvent-extracting resulting reformate to produce a predominately aromatic extract and a predominately paraffinic raffinate, that improvement which comprises separately reforming with the same type of catalyst and also under non-regenerative conditions, in the presence of hydrogen said raffinate at about 960° F. and at about 500 p.s.i. after extraction and then introducing it along with fresh feed naphtha into said first-mentioned catalytic reforming step, whereby the suppression of dehydrocyclization by aromatic compounds is avoided when reforming said raffinate.

3. A process for producing highly aromatic antiknock gasoline components, which comprises catalytically reforming in the presence of hydrogen and of platinum-containing catalyst and at a temperature of about 935° F., a pressure in the order of 500 p.s.i., whereby said catalyst is used under non-regenerative conditions, a naphtha fraction within the gasoline boiling range to convert a substantial portion of said naphtha to aromatic hydrocarbons with the production of additional hydrogen, fractionating the resulting reformate to remove therefrom low-boiling gasoline components, extracting the remaining higher boiling constituents of said reformate, to remove substantially all the aromatic hydrocarbons therefrom, leaving an essentially paraffinic portion, partially catalytically reforming said paraffinic portion in the presence of hydrogen with the same catalyst and substantially the same pressure, at a temperature of about 960° F., whereby said catalyst is likewise used under non-regenerative conditions, and then introducing the resultant partially reformed paraffinic portion into the first-mentioned catalytic reforming step as part of said naphtha fraction.

4. A process for producing gasoline components having high anti-knock qualities under non-regenerative conditions of platinum catalyst, comprising: heating in a first heating zone a reformer charge comprising a low-octane naphtha and free hydrogen to a temperature of approximately 935° F.; introducing the thus heated reformer charge, at a liquid hourly space velocity at about 3, and a pressure of about 500 p.s.i. into a first main reforming zone containing a platinum catalyst, and therein reforming said charge under non-regenerative conditions of the catalyst; running the resulting reformate into a fractionation zone and therein fractionating the reformate into fractions consisting essentially of (1) hydrogen, (2) $C_1$ to $C_3$ hydrocarbons, (3) light hydrocarbons boiling below approximately 200° F. and (4) heavy hydrocarbons boiling above approximately 200° F.; blending the (3) light hydrocarbons into gasoline stock; charging the (4) heavy hydrocarbons into an extraction zone and therein extracting the aromatics from the said (4) heavy hydrocarbons; blending the extract with the said gasoline stock to which is added the (3) light hydrocarbons; heating in an auxiliary heating zone the raffinate from the said extraction zone, together with an amount of (1) hydrogen, to approximately 960° F.; introducing the thus heated raffinate and (1) hydrogen at a space velocity of about 5 and at a pressure of about 500 p.s.i. into an auxiliary reforming zone containing a platinum catalyst, therein partially reforming said raffinate under non-regenerative conditions of the catalyst; and adding the resulting partially reformed raffinate to the said reformer charge to the said first heating zone.

References Cited in the file of this patent

UNITED STATES PATENTS

| | | |
|---|---|---|
| 2,409,695 | Laughlin | Oct. 22, 1946 |
| 2,697,684 | Hemminger et al. | Dec. 21, 1954 |
| 2,740,751 | Haensel et al. | Apr. 3, 1956 |
| 2,880,164 | Viland | May 31, 1959 |

FOREIGN PATENTS

| | | |
|---|---|---|
| 1,084,600 | France | Jan. 20, 1955 |
| 742,966 | Great Britain | Jan. 4, 1956 |